US009561633B2

(12) United States Patent
Nakai et al.

(10) Patent No.: US 9,561,633 B2
(45) **Date of Patent: *Feb. 7, 2017**

(54) HOT ISOSTATIC PRESSING DEVICE

(71) Applicant: KOBE STEEL, LTD., Kobe-shi (JP)

(72) Inventors: Tomomitsu Nakai, Takasago (JP); Katsumi Watanabe, Takasago (JP); Makoto Yoneda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/888,568

(22) PCT Filed: Jun. 10, 2014

(86) PCT No.: PCT/JP2014/065383
§ 371 (c)(1),
(2) Date: Nov. 2, 2015

(87) PCT Pub. No.: WO2015/005047
PCT Pub. Date: Jan. 15, 2015

(65) Prior Publication Data

US 2016/0059504 A1 Mar. 3, 2016

(30) Foreign Application Priority Data

Jul. 12, 2013 (JP) ................................. 2013-146496

(51) Int. Cl.
*B29C 43/10* (2006.01)
*B30B 11/00* (2006.01)
(Continued)

(52) U.S. Cl.
CPC ............. *B30B 11/002* (2013.01); *F27B 17/00* (2013.01); *F27B 17/0083* (2013.01); *F27D 7/04* (2013.01)

(58) Field of Classification Search
CPC ..................................................... B30B 11/002
(Continued)

(56) References Cited

U.S. PATENT DOCUMENTS 6,250,907 B1 * 6/2001 Bergman .............. B30B 11/002 425/405.2
8,647,092 B2 * 2/2014 Nakai .................. B30B 11/002 425/405.2
(Continued)

FOREIGN PATENT DOCUMENTS

JP 2007-309626 A 11/2007
JP 2011-508671 A 3/2011
(Continued)

OTHER PUBLICATIONS

International Search Report and Written Opinion issued on Jul. 15, 2014 for PCT/JP2014/065383 filed on Jun. 10, 2014.

*Primary Examiner* — Joseph S. Del Sole
*Assistant Examiner* — Thukhanh T Nguyen
(74) *Attorney, Agent, or Firm* — Oblon, McClelland, Maier & Neustadt, L.L.P.

(57) ABSTRACT

Provided is a hot isostatic pressing device (HIP) (1) that enables prompt cooling in a processing chamber. The HIP device (1) is provided with the following: gas impermeable casings (3, 4); a heating unit (7); a high-pressure container (2); a heat accumulator (43) provided below a processing chamber; and a cooling promotion flow path (44). The casings (3, 4) are disposed so as to form the following: a first circulation flow (41) in which a pressure medium gas passes through an inner flow path (22) and an outer flow path (12) and then returns to the inner flow path (22); and a second circulation flow (42) in which the pressure medium gas which has branched off from the first circulation flow (41) performs heat exchange with an object-of-processing (W) in the processing chamber and then is fed back to the first
(Continued)

circulation flow (41). In the cooling promotion flow path (44), the pressure medium gas that is in the second circulation flow (42) and that has performed heat exchange with the object-of-processing (W) is guided to the heat accumulator (43) and cooled by the heat accumulator (43) before the pressure medium gas merges with the first circulation flow (41).

4 Claims, 1 Drawing Sheet

(51) Int. Cl.
*F27B 17/00* (2006.01)
*F27D 7/04* (2006.01)

(58) Field of Classification Search
USPC ............. 425/73–74, 77–78, 210, 405.2, 815; 432/199, 205, 233, 249; 219/400
See application file for complete search history.

(56) References Cited

U.S. PATENT DOCUMENTS

2011/0008741 A1 1/2011 Gardin
2011/0165283 A1 7/2011 Nakai et al.
2013/0071508 A1* 3/2013 Nakai ................... B30B 11/002
425/405.2

FOREIGN PATENT DOCUMENTS

JP 2011-127886 A 6/2011
WO 2012/092961 A1 7/2012

* cited by examiner

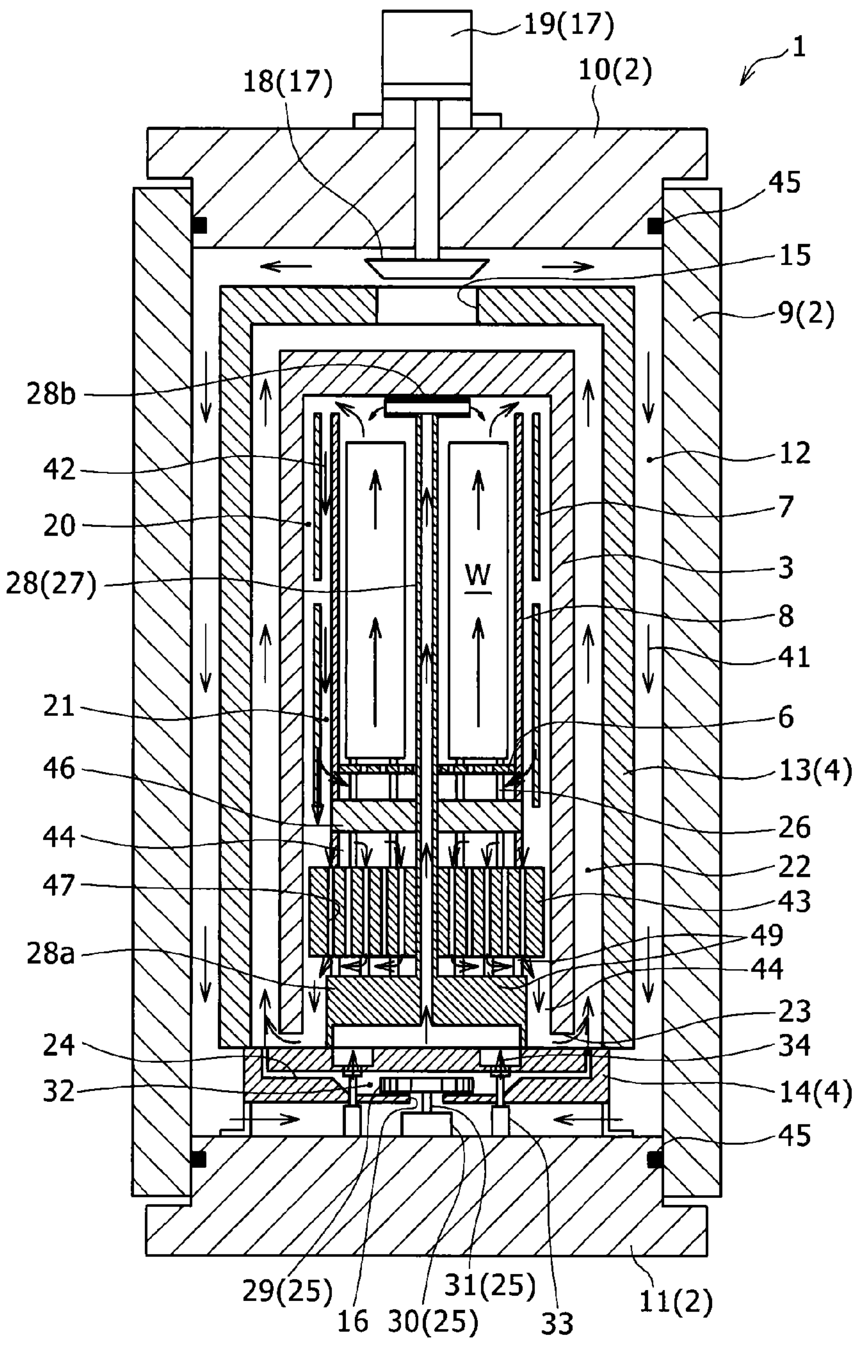
19(17)
1
18(17)
10(2)
45
15
9(2)
28b
12
42
7
20
3
28(27)
W
8
41
21
6
13(4)
46
26
44
22
47
43
49
28a
44
23
24
34
32
14(4)
45
29(25)
31(25)
11(2)
16
30(25)
33

HOT ISOSTATIC PRESSING DEVICE

TECHNICAL FIELD

The present invention relates to a hot isostatic pressing device.

BACKGROUND ART

Conventionally, HIP processing which is a pressing method using a hot isostatic pressing device has been known. In this HIP processing, a workpiece such as a sintered product (ceramics, etc.) or a cast product is processed under an atmosphere of pressure medium gas set at high pressure of several tens to several hundreds MPa, in such a way that a temperature of the workpiece is increased to be equal to or higher than its recrystallization temperature. The HIP processing is characterized in that residual pores in the workpiece can be extinguished. Therefore, this HIP processing has today come to be widely used for industrial purposes in order to improve mechanical characteristics, reduce variations of characteristics, and improve yields.

Incidentally, in an actual production side, speeding-up of the HIP processing is strongly desired. In order to do so, a cooling step which takes time among steps of the HIP processing essentially has to be performed in a short time. Thus, in conventional hot isostatic pressing devices (hereinafter each referred to as an HIP device), an improvement of the coiling speed in a state where the inside of a furnace is maintained in a thermally uniform condition has been considered.

For example, Patent document 1 discloses a hot isostatic pressing device in which a portion of pressure medium gas forming a first circulation flow is allowed by using a fan or an ejector to pass from the lower side of a hot zone to join a second circulation flow and the joined pressure medium gas is cooled and circulated in the hot zone to eliminate a temperature difference generated between upper and lower portions of a furnace in a cooling step, whereby the inside of the furnace is effectively cooled.

In a container of Patent document 1, the low-temperature pressure medium gas is not directly guided into the furnace; therefore, an inner circumferential surface of the container is not excessively cooled. Further, a forcible circulation by means of the ejector can realize a high cooling speed. Furthermore, compared with a case where the fan is provided in the hot zone, the ejector not having the limitation of heat-resisting properties or the like to materials is used; therefore, the furnace structure is not complicated and a cost increase of the HIP device is inhibited.

Patent document 2 discloses a technique in which pressure medium gas in a high-pressure container is removed therefrom and is cooled to be thereafter returned into the container and a cooling step is thereby performed in a short time.

The conventional HIP device provides a quick cooling technique for the purpose of an improvement of productivity, and it can remarkably reduce a cooling time required for cooling from a high-temperature range of from 1000 degrees C. to 1400 degrees C., which is a processing temperature of the HIP processing to a low-temperature range of equal to or lower than 300 degrees C. in which a workpiece can be removed. Specifically, an average cooling speed is generally no more than a few degrees C. per minute in natural cooling; however, a cooling speed of several tens of degrees C. per minute can be attained in the conventional HIP device.

Meanwhile, a solution heat treatment or the like is performed to aluminum alloy casting products or precision casting products of alloys based on nickel. However, these days quickly cooling is performed after the HIP processing; thereby, these heat treatments have been required to be performed successively to the HIP processing. Quick cooling required in such solution heat treatment cannot be performed by a general HIP device, the cooling speed of which is lower; therefore, previously, reheating processing and quick cooling are performed in a different furnace from the furnace for the HIP processing.

Here, the cooling speed required for quickly cooling targeted to aluminum alloy casting products or precision casting products of alloys based on nickel is very high, at least several tens of degrees C. per minute or higher, and a cooling speed of 100 degrees C. per minute or higher may be required depending on thicknesses or materials of workpieces. Such high cooling speed is difficult to be achieved by the conventional HIP device.

CITATION LIST

Patent Document

Patent Document 1: JP2011-127886A
Patent Document 2: JP2007-309626A

SUMMARY OF THE INVENTION

An object of the present invention is to provide an HIP device which includes a processing chamber and which can cool the inside of the processing chamber in a short time.

The present invention provides a hot isostatic pressing device which includes a processing chamber to perform isostatic pressing processing to a workpiece by using pressure medium gas in the processing chamber, the hot isostatic pressing device including: a gas impermeable casing arranged to surround the workpiece; a heating unit provided inside the casing to form the processing chamber around the workpiece; a high-pressure container housing the heating unit and the casing; a heat accumulator provided below the processing chamber, the heat accumulator being thermally exchanged with the pressure medium gas to promote cooling of the pressure medium gas; and a cooling promotion flow path formed within the casing. The casing is arranged to form a first circulation flow in which the pressure medium gas passes upward through an inner flow path in the casing, passes downward through an outer flow path between an inner circumferential surface of the high-pressure container and an outer circumferential surface of the casing, and then returns to the inner flow path and to form a second circulation flow in which the pressure medium gas that has diverged from the first circulation flow is thermally exchanged with the workpiece inside the processing chamber in the casing and then returns to the first circulation flow. Before the pressure medium gas of the second circulation flow thermally exchanged with the workpiece joins the pressure medium gas of the first circulation flow, the cooling promotion flow path guides the pressure medium gas of the second circulation flow to the heat accumulator to allow the pressure medium gas of the second circulation flow to be cooled by the heat accumulator.

BRIEF DESCRIPTION OF DRAWINGS

FIG. 1 is a front sectional view of an HIP device according to an embodiment of the present invention.

DESCRIPTION OF EMBODIMENTS

Hereinafter, an embodiment of the present invention will be explained in detail with reference to the drawing.

FIG. 1 shows a hot isostatic pressing device 1 (also referred to as an HIP device 1) of the embodiment. This HIP device 1 includes a high-pressure container 2, an inner casing 3, and an outer casing 4. An inner flow path 22 which is a pathway allowing pressure medium gas to flow upward and downward is provided between the inner casing 3 and the outer casing 4. A first valve 17 configured to open and close a passage is provided in the pathway. The HIP device 1 includes a processing chamber for performing HIP processing of a workpiece W by using the pressure medium gas. In a cooling step of cooling this processing chamber, the pathway is closed. The pressure medium gas forms a first circulation flow 41 in which the pressure medium gas flows upward between the inner casing 3 and the outer casing 4; is then cooled by heat exchange with an inner circumferential surface of the high-pressure container 2 while being guided by an outer flow path 12, which is a gap between the inner circumferential surface of the high-pressure container 2 and an outer circumferential surface of the outer casing 4, to flow downward through this gap; and is thereafter guided from a lower portion of an outer casing bottom body 14 through a second distribution path 24, which is a gas flow path, back to the inner flow path 22. Further, a portion of the pressure medium gas has diverged from the first circulation flow 41 and the diverged pressure medium gas is guided into the processing chamber to be thermally exchanged with the workpiece W. Thereafter, the pressure medium gas passes through a cooling promotion flow path 44 which is a gas route, to be thermally exchanged with a heat accumulator 43 positioned below the processing chamber. Afterward, the pressure medium gas joins the first circulation flow 41. The details will be described below.

The high-pressure container 2 houses the workpiece W. The inner casing 3 having gas impermeability is arranged so as to surround the workpiece W within the high-pressure container 2. The outer casing 4 having gas impermeability is arranged so as to surround the inner casing 3 from the outside thereof. These inner casing 3 and outer casing 4 configure a "casing" according to the present invention. A heat shield member is arranged between the inner casing 3 and the outer casing 4; thereby, the inside of the inner casing 3 is thermally isolated from the outside.

The HIP device 1 further includes a workpiece support table 6, a heating unit 7, and a straightening cylinder 8. The workpiece support table 6 supports the workpiece W within the inner casing 3. The heating unit 7 heats the pressure medium gas and forms the processing chamber. The workpiece W is mounted on the workpiece support table 6. The straightening cylinder 8 is provided between the heating unit 7 and the workpiece W to thereby partition a room therebetween. The heating unit 7 is provided outside the straightening cylinder 8 to heat the pressure medium gas. This heated high-temperature pressure medium gas is supplied from the upper side of the straightening cylinder 8 into the straightening cylinder 8, thereby forming a hot zone as an atmosphere of the pressure medium gas around the workpiece W. In this hot zone, hot isostatic pressing processing (hereinafter referred to as the HIP processing) of the workpiece W is performed.

Components configuring the HIP device 1 will be explained in detail below.

As shown in FIG. 1, the high-pressure container 2 includes a container body 9 formed in a cylindrical shape around an axis along an up and down direction, a lid body 10, and a bottom body 11. The container body 9 includes an opening at the upper side (at the upper side on the sheet of FIG. 1) and an opening at the lower side (at the lower side on the sheet of FIG. 1). The lid body 10 closes the upper opening and the bottom body 11 closes the lower opening.

Seals 45 are respectively arranged between an upper end portion of the container body 9, which surrounds the foregoing upper opening, and the lid body 10 and between a lower end portion of the container body 9, which surrounds the lower opening, and the bottom body 11. These seals 45 physically isolate the inside of the high-pressure container 2 from the outside.

A supply pipe (not shown) and a discharge pipe (not shown) are arranged around the high-pressure container 2 and are connected to the high-pressure container 2. Through the supply pipe and the discharge pipe, the high-pressure pressure medium gas, for example, argon gas or nitrogen gas boosted to about 10 MPa to 300 MPa to enable the HIP processing is supplied into and discharged from the high-pressure container 2.

The outer casing 4 is arranged inside the high-pressure container 2. The outer casing 4 includes an outer casing body 13 and the outer casing bottom body 14. The outer casing body 13 integrally includes a cylindrical circumferential wall portion and an upper lid portion which closes an upper end opening of this circumferential wall portion. This outer casing 4 is formed by means of a gas impermeable heat resisting material such as stainless steel, nickel alloy, molybdenum alloy, or graphite, in accordance with temperature conditions of the HIP processing. The circumferential wall portion of the outer casing body 13 of the outer casing 4, having an outer diameter smaller than an inner diameter of the foregoing high-pressure container 2 is arranged and spaced radially inward from the inner circumferential surface of the high-pressure container 2. That is, a clearance is formed between the outer circumferential surface of the outer casing 4 and the inner circumferential surface of the high-pressure container 2. This clearance configures the outer flow path 12 that allows the pressure medium gas to be distributed along the up and down direction.

The outer casing body 13 includes a lower opening and the outer casing bottom body 14 closes the lower opening of the outer casing body 13. An upper opening 15 is formed in the middle of the upper lid portion of the outer casing body 13. The upper opening 15 allows the pressure medium gas within the outer casing 4 to be guided upward through the upper opening 15 to the outside of the outer casing 4. The first valve 17 opens and closes the upper opening 15, thereby shifting a state where the distribution of the pressure medium gas from the inside of the outer casing 4 to the outer flow path 12 of the outside of the outer casing 4 is allowed to a state where the distribution of the pressure medium gas is blocked and vice versa.

Further, a lower opening 16 and the second distribution path 24 are formed in the outer casing bottom body 14. In the same way as the upper opening 15, the lower opening 16 formed in the middle of the outer casing bottom body 14 receives the pressure medium gas flowing through the outer flow path 12 to the lower side of the outer casing bottom body 14. A portion of the pressure medium gas received by the lower opening 16 flows through the second distribution path 24 to the inner flow path 22 and the rest of the pressure medium gas is guided through a conduit 28 into the hot zone. Furthermore, a forced circulation device 25 which promotes circulation of the pressure medium gas introduced through this lower opening 16 into the outer casing bottom body 14 is arranged in the lower opening 16.

The second distribution path 24 is formed within the outer casing bottom body 14 so as to connect the upper and lower sides of the outer casing bottom body 14. The second distribution path 24 allows the pressure medium gas taken from the lower opening 16, which is an inlet provided in a lower surface of the outer casing bottom body 14, to return through an outlet, which is formed in a top surface of the outer casing bottom body 14, to the inner flow path 22.

The first valve 17 is a mechanism which is provided in the pathway of the pressure medium gas to open and close the pathway. This first valve 17 includes: a plug member 18 having a shape which can close the upper opening 15 of the outer casing 4; and a moving means 19 allowing this plug member 18 to move in the up and down direction. The moving means 19 is provided outside the high-pressure container 2 to allow the plug member 18 to move upward and downward. This movement of the plug member 18 opens and closes the upper opening 15; thereby, the pressure medium gas passing through the upper opening 15 can be distributed and blocked as appropriate.

The inner casing 3 is a casing arranged inside the outer casing 4. In the same way as the outer casing body 13 of the outer casing 4, the inner casing 3 integrally includes a circumferential wall portion and an upper lid portion. The circumferential wall portion is formed in a substantially cylindrical shape extending along the up and down direction, and the upper lid portion closes an upper end opening of the circumferential wall portion. The circumferential wall portion of the inner casing 3, having an outer diameter smaller than an inner diameter of the circumferential wall portion of the outer casing body 13 of the outer casing 4 is arranged and spaced radially inward from an inner circumferential surface of the outer casing body 13. That is, the inner casing 3 is arranged so that clearances are formed in the radial direction and the up and down direction between an outer surface of the inner casing 3 and an inner surface of the outer casing body 13 of the outer casing 4. The heat shield members are arranged in the clearances between the outer casing 4 and the inner casing 3. This heat shield member is formed by a heat shield material having gas distributability, for example, a graphite material in which carbon fibers are braided or by a porous material such as ceramic fibers.

The inner casing 3 is provided with a heat resisting material which is the same as that of the outer casing 4. The inner casing 3 opened downward is arranged in a position slightly above the top surface of the foregoing outer casing bottom body 14. Therefore, the clearance in the up and down direction is secured between a lower end of the inner casing 3 and the top surface of the outer casing bottom body 14. This clearance configures a distribution path 23 which allows the pressure medium gas within the inner casing 3 to be distributed to the inner flow path 22 that is located outside the inner casing 3.

The heating unit 7 and the straightening cylinder 8 are provided within the inner casing 3, and the heating unit 7 is positioned at the radially outward side of the straightening cylinder 8. The hot zone is formed inside the straightening cylinder 8.

Next, the inner structure of the inner casing 3 will be explained.

The heating unit 7 includes plural heater elements (two heater elements in an example shown in FIG. 1), and these heater elements are arranged side by side in the up and down direction. The heating unit 7 is arranged and spaced radially inward from the inner circumferential surface of the inner casing 3. The straightening cylinder 8 is arranged and spaced further radially inward from the heating unit 7.

An outer gas distribution path 20 and an inner gas distribution path 21 that allow the pressure medium gas to be distributed upward and downward are formed at the outer and inner sides of the heating unit 7, respectively. In particular, the outer gas distribution path 20 is a flow path formed between the inner circumferential surface of the circumferential wall portion of the inner casing 3 and the heating unit 7 and extending along the inner surface of the inner casing 3 in the up and down direction. The inner gas distribution path 21 is configured so that most of the pressure medium gas distributed in this outer gas distribution path 20 flows into the cooling promotion flow path 44 which will be described in detail below. The inner gas distribution path 21 is a flow path formed between the inner circumferential surface of the circumferential wall portion of the inner casing 3 and the straightening cylinder 8 and extending along an outer circumferential surface of the straightening cylinder 8 in the up and down direction. Most of the pressure medium gas distributed in the inner gas distribution path 21 is divided to flow through plural gas introduction holes 26 formed in the straightening cylinder 8 and through the cooling promotion flow path 44.

The straightening cylinder 8 is formed by a plate member which is gas impermeable. The straightening cylinder 8 is formed in a cylindrical shape to be opened both upward and downward. An upper end of the straightening cylinder 8 is positioned slightly lower than a lower surface of the upper lid portion of the inner casing 3. Thus, a clearance in the up and down direction is formed between the upper end of the straightening cylinder 8 and the lower surface of the upper lid portion of the inner casing 3, and this clearance allows the pressure medium gas within the straightening cylinder 8 (in the hot zone) to be guided through the clearance to a gas distribution path (the inner gas distribution path 21 or the outer gas distribution path 20) provided outside the straightening cylinder 8.

The workpiece support table 6 is provided below the straightening cylinder 8. This workpiece support table 6 formed by a member which allows distribution of the pressure medium gas, for example, by a porous plate, and the pressure medium gas passes through the workpiece support table 6 and can be guided upward. The workpiece W is mounted on the workpiece support table 6. Such mounting of the workpiece W is realized by providing a spacer between the workpiece support table 6 and the workpiece W so as that the workpiece W is not directly in contact with a top surface of the workpiece support table 6 (the workpiece W is provided in an elevated position).

Each of the gas introduction holes 26 is formed in a position of the straightening cylinder 8, which is located below the workpiece support table 6. These gas introduction holes 26 penetrate in and out of a lateral wall of the straightening cylinder 8; thereby, the pressure medium gas flowing in the inner gas distribution path 21 can be introduced through the gas introduction holes 26 into the straightening cylinder 8. The pressure medium gas introduced through the gas introduction holes 26 into the straightening cylinder 8 as just described flows through the foregoing workpiece support table 6 to the upper side of the workpiece support table 6, therefore being supplied to the HIP processing in the hot zone formed above the workpiece support table 6.

In the HIP device 1 according to the embodiment, first cooling and second cooling that are stated below are performed as a mode of cooling the inside of the hot zone.

The first cooling is performed by circulating the pressure medium gas within the high-pressure container 2 in such a manner that the pressure medium gas forms the first circulation flow 41. The pressure medium gas forming this first circulation flow 41 circulates in a manner to flow upward in the inner flow path 22 formed between the above-mentioned outer casing 4 and the above-mentioned inner casing 3, be guided through the upper opening 15 of the outer casing 4 to the outer flow path 12, be guided downward along the outer flow path 12 and cooled by contacting a container wall of the high-pressure container 2, and return through the second distribution path 24 of the outer casing 4 to the inner flow path 22.

The second cooling is performed by circulating the pressure medium gas in such a manner that the pressure medium gas forms a second circulation flow 42. In the second circulation flow 42, a portion of the pressure medium gas in the hot zone is guided to the outside thereof to unite at a lower end of the inner flow path 22 into the pressure medium gas that is forcibly circulated in the first cooling so as to form the first circulation flow 41, thereby being cooled. Then, a portion of the pressure medium gas cooled as just described is circulated so as to return to the hot zone. A portion of the pressure medium gas cooled by the foregoing first cooling is cooled at the outer side of the outer casing 4 and is thereafter introduced by a gas introduction means 27 from the upper side of the hot zone into the hot zone.

This HIP device 1 further includes plural second valves 34 each serving as a throttle portion. These second valves 34 are driven by an actuator 33, thereby varying an area of a flow path between the lower opening 16 of the foregoing outer casing bottom body 14 and the second distribution path 24. Therefore, a ratio of a flow rate of the pressure medium gas distributed in the second distribution path 24 (a flow rate of the pressure medium gas flowing in the first circulation flow 41) to a flow rate of the pressure medium gas distributed through the gas introduction means 27 into the hot zone (a flow rate of the pressure medium gas flowing in the second circulation flow 42) can be adjusted. Specifically, a fan housing portion 32 which is a space positioned above the lower opening 16, and plural communication holes which are communicated with this fan housing portion 32 and a space above the outer casing bottom body 14 to allow the pressure medium gas within the fan housing portion 32 to be sent to the gas introduction means 27, are formed within the outer casing bottom body 14. The foregoing second valves 34 open and close the communication holes; thereby, the flow rate of the pressure medium gas flowing from the fan housing portion 32 to the gas introduction means 27 can be adjusted. These second valves 34 enable the ratio (a flow ratio) of the flow rate of the pressure medium gas flowing in the first circulation flow 41 to the flow rate of the pressure medium gas flowing in the second circulation flow 42 to be adjusted as appropriate; thereby, a cooling speed of the HIP device 1 can be further precisely controlled.

The gas introduction means 27 includes the conduit 28 and the forced circulation device 25. The conduit 28 extends from the lower side to the upper side of the hot zone while being opened to the upper side of the hot zone. The pressure medium gas cooled at the outer side of the casing is guided by the forced circulation device 25 along the conduit 28 to the upper side of the hot zone.

The forced circulation device 25 serves to forcibly introduce the pressure medium gas at the lower side of the lower opening 16 of the outer casing bottom body 14 through the lower opening 16 into the hot zone to circulate the pressure medium gas. The forced circulation device 25 of the embodiment includes: a motor 30 provided at the bottom body 11 of the high-pressure container 2; a shaft portion 31 extending upward from this motor 30 through the lower opening 16; and a fan 29 attached to an upper end of the shaft portion 31. This fan 29 is housed in the fan housing portion 32 formed within the outer casing bottom body 14 as described above, and the lower opening 16 allows the fan housing portion 32 to communicate with the outer flow path 12. The fan 29 rotates about the shaft portion 31, that is, the fan 29 rotates about an axis which extends in the up and down direction while penetrating through the lower opening 16, thereby forcibly generating a flow of the pressure medium gas flowing upward.

In other words, in this forced circulation device 25, the fan 29 provided at the upper end of the shaft portion 31 is rotated by the motor 30; thereby, the pressure medium gas accumulated at the lower side of the outer casing bottom body 14 forcibly flows through the lower opening 16 into the fan housing portion 32. Then, a portion or all of the pressure medium gas flown into the fan housing portion 32 is sent through the conduit 28 to the upper side of the hot zone to further flow from the upper side of the hot zone thereinto, therefore being used to cool the inside of the hot zone. The forced circulation device 25 is not limited to a forced circulation device including the fan 29 and may be a forced circulation device in which for example, a pump or the like is used.

The conduit 28 serves to send the pressure medium gas flown in the fan housing portion 32 to the upper side of the hot zone. The conduit 28 is formed by a tubular material internally forming a void so that the pressure medium gas does not leak from the conduit to the outside and so that the pressure medium gas can be guided while not meeting the pressure medium gas of the hot zone. A lower end portion 28*a* of the conduit 28 has outer and inner diameters greater than outer and inner diameters of portions other than the lower end portion 28*a*. The lower end portion 28*a* is opened downward while having a large area within which all of the plural communication holes can be included. The pressure medium gas of the fan housing portion 32 can be introduced from this opening through the respective communication holes having the second valves 34 into the conduit 28. Further, the conduit 28 extends upward from a position below the hot zone, i.e., from a position in which the fan housing portion 32 is provided, to the upper side of the hot zone in a manner to penetrate through the inside of the straightening cylinder 8 in the up and down direction. An upper end portion 28*b* of this conduit 28 is diverged into a T-shape at a substantially lower side of a top surface of the inner casing 3, thereby forming plural outlets. Accordingly, the pressure medium gas can blow out from these outlets horizontally into the hot zone.

In other words, the conduit 28 extends upward from an opening (an opening at the lower side) of the lower end portion 28*a* positioned above the fan housing portion 32 through the center of the hot zone to be diverged radially outward into two portions in the hot zone above the straightening cylinder 8. The pressure medium gas cooled and blown out from ends of this conduit 28 flows horizontally along the top surface of the inner casing 3, thereafter flowing into the outer gas distribution path 20 and the inner gas distribution path 21 in a manner to involve the hot-temperature pressure medium gas at the upper side of the hot zone. At this time, the pressure medium gas cooled while forming the first circulation flow 41 is brought into contact with and mixed with the pressure medium gas moving upward in the hot zone. Thus, the pressure medium gas of the first cooling portion and the pressure medium gas of a second cooling portion that are not easily mixed with each other, i.e., gases having a large temperature difference to each other can be surely mixed with each other.

Next, the heat accumulator 43 and the cooling promotion flow path 44 that characterize this HIP device 1 will be explained in detail.

As shown in FIG. 1, the heat accumulator 43 is a substantially column-shaped member which includes an outer diameter slightly smaller than an inner diameter of the inner casing 3 and which has a thickness in the up and down direction. The heat accumulator 43 is provided within the inner casing 3 so as to be located below the heating unit 7. The heat accumulator 43 exemplary illustrated is movably fitted to the inner side of the circumferential wall portion of the inner casing 3 formed in the cylindrical shape.

A lower portion heat shield member 46 partitioning the straightening cylinder 8 into upper and lower portions is provided at a lower portion of the foregoing straightening cylinder 8, which is located below the workpiece support table 6. This lower portion heat shield member 46 is a member for blocking permeation of the pressure medium gas. The lower portion heat shield member 46 partitions an inside space of the straightening cylinder 8 in an interior space of the inner casing 3 into upper and lower portions. The heat accumulator 43 is provided further below this lower portion heat shield member 46. In addition, plural spacers 49 for forming clearances between a lower surface of the heat accumulator 43 and the lower end portion 28*a* of the conduit 28 are provided below the heat accumulator 43.

The heat accumulator 43 includes a large heat capacity and a large surface area so as to absorb a large amount of heat energy. Such heat accumulator 43 may include, for example, a member of a porous structure as porous ceramics internally including multiple pores, a multiply structure in which plural metallic plates are arranged to be spaced from one another, or a member having a structure in which small ceramic pieces or microparticles are sparsely accumulated. The heat accumulator 43 including such structure has the large heat capacity and the high heat transference, therefore being provided with a sufficient cooling capability for the high-temperature pressure medium gas flowing down in the heat accumulator 43.

For example, the heat accumulator 43 includes a member of a porous structure internally having multiple pores; therefore, a contact surface area of the heat accumulator 43 with a gas flow at the time of cooling drastically increases to increase heat exchange efficiency. Further, in a case other than the time of quick cooling, i.e., when there is no gas flow as in a case where a temperature in the hot zone is increased or maintained, the member of such porous structure (an accumulated layer) functions as a heat shield material for inhibiting heat from transmitting downward.

Meanwhile, in the case of the heat accumulator 43 including a multiply structure with plural metallic plates wherein these metallic plates are arranged to be spaced from one another, the heat accumulator 43 has an effect to increase heat exchange efficiency on a gas flow at the time of cooling in the same way as the case of the above-mentioned porous structure. Further, likewise the case of the porous structure, when there is no gas flow as in a case where a temperature in the hot zone is increased or maintained, the heat accumulator 43 can exert its shielding effect against heat transmitting downward.

In the embodiment shown in FIG. 1, plural gas introduction holes 47 are formed within the heat accumulator 43. The pressure medium gas above the heat accumulator 43 is guided by these gas introduction holes 47 so as to flow through the gas introduction holes 47 to the lower side of the heat accumulator 43. These gas introduction holes 47 horizontally separated from one another contribute to an expansion of a heat exchange area of the pressure medium gas introduced into the respective gas introduction holes 47 with the heat accumulator 43; therefore, the effect similar to that of the heat accumulator including the above-mentioned porous member or multiply structure.

A vertical position of the heat accumulator 43 is provided at a location below the hot zone where the heat accumulator 43 can be avoided from being directly heated by the heating unit 7, that is, at a low-temperature location outside the hot zone. Therefore, a temperature of the heat accumulator 43 is lower than a temperature at the upper side of the hot zone. This offers the cooling capability to the heat accumulator 43 so as to cool the high-temperature pressure medium gas in the hot zone.

The cooling promotion flow path 44 is a flow path for promoting a contact of the foregoing heat accumulator 43 with the pressure medium gas that has diverged from the second circulation flow 42. Specifically, the cooling promotion flow path 44 is a flow path connecting a flow, which has diverged from lower ends of the outer gas distribution path 20 and the inner gas distribution path 21, through the heat accumulator 43 to the first distribution path 23. A portion of the pressure medium gas flowing downward through the outer gas distribution path 20 and the inner gas distribution path 21 is the gas passing through the cooling promotion flow path 44 to be sent to the heat accumulator 43. The pressure medium gas sent to the heat accumulator 43 in this manner is distributed to the plural gas introduction holes 47 to pass through the respective gas introduction holes 47, thereby being cooled. The pressure medium gas cooled in this manner passes through the first distribution path 23 formed at the lower side of the inner casing 3 and unites at the lower end of the inner flow path 22 into the first circulation flow 41 flowing in the inner flow path 22.

In the event of quickly cooling the inside of the processing chamber of the foregoing HIP device 1, the first valve 17 is firstly opened. Specifically, the plug member 18 is moved upward by the moving means 19 of the first valve 17, thereby opening the upper opening 15 of the outer casing 4. Meanwhile, the fan 29 of the forced circulation device 25, provided in the fan housing portion 32 of the outer casing bottom body 14 is driven to rotate; thereby, the pressure medium gas below the outer casing bottom body 14 flows through the lower opening 16 into the fan housing portion 32. A portion of the pressure medium gas flown into the fan housing portion 32 flows through the second distribution path 24 into the inner flow path 22 and moves upward through the inner flow path 22, thereafter flowing out from the upper opening 15 of the outer casing 4 to the outer flow path 12. Afterward, the pressure medium gas moves downward along the outer flow path 12. When moving downward in this manner, the pressure medium gas is thermally exchanged with an inner circumferential wall of the high-pressure container 2, thereby being cooled. The pressure medium gas cooled in this manner returns to the lower side of the outer casing bottom body 14. Such flow of the pressure medium gas is the first circulation flow 41. That is, the pressure medium gas is cooled while forming this first circulation flow.

On the other hand, when the communication holes are opened by the second valves 34, the rest of the pressure medium gas flown into the fan housing portion 32 flows through the conduit 28 of the gas introduction means 27 into the hot zone. That is, the pressure medium gas cooled and blown out from the upper end portion 28*b* of the conduit 28 radially outward flows into the outer gas distribution path 20 and the inner gas distribution path 21 while involving the high-temperature pressure medium gas of the processing chamber being moved upward by natural convection. Then, the pressure medium gas cools the heating unit 7 or the like while moving downward through the outer gas distribution path 20 and the inner gas distribution path 21, and a portion of the pressure medium gas returns from the lower ends of these distribution paths 20, 21 into the hot zone and the rest of the pressure medium gas flows into the cooling promotion flow path 44. That is, a portion of the pressure medium gas flowing down in the gas distribution paths 20, 21 flows through the gas introduction holes 26 of the straightening cylinder 8 into the processing chamber to be supplied to cool the workpiece W in the processing chamber.

The pressure medium gas flown into the cooling promotion flow path 44 is guided through the cooling promotion flow path 44 to the heat accumulator 43 to be distributed to the plural gas introduction holes 47, therefore being thermally exchanged within the respective gas introduction holes 47 with the heat accumulator 43. As described above, the heat accumulator 43 is provided in the low-temperature location outside the hot zone, therefore being provided with the cooling capability to sufficiently cool the pressure medium gas in the processing chamber. Thus, the pressure medium gas sent to the heat accumulator 43 is quickly cooled in a short time, and the pressure medium gas is cooled to a lower temperature at a certain level to unite through the first distribution path 23 into the first circulation flow 41.

If the heat accumulator 43 does not exist, a flow rate of the pressure medium gas joining from the second circulation flow 42 to the first circulation flow 41 is excessively increased in order to increase the cooling speed in the processing chamber. Therefore, a temperature of the pressure medium gas being distributed in the first circulation flow 41 excessively increases, resulting in burnout of the motor 30 of the forced circulation device 25 or the actuator 33. Consequently, in such case, the flow rate of the pressure medium gas allowed to join from the second circulation flow 42 to the first circulation flow 41 is extremely limited.

However, the pressure medium gas once cooled by using the foregoing heat accumulator 43 is brought to join the first circulation flow 41, enabling an increase of the flow rate of the pressure medium gas joining from the second circulation flow 42 to the first circulation flow 41. Thus, regardless the volume of the workpiece W or manufacturing conditions, a cooling speed higher than approximately 100 degrees C. per minute can be obtained. As described above, the lower side of the processing chamber is maintained at a relatively low temperature compared with a temperature inside the processing chamber. Therefore, even if the temperature inside the processing chamber is high, exceeding 1000 degrees C., the heat accumulator 43 provided in the processing chamber is maintained at a temperature of 300 degrees C. to 400 degrees C. lower than the temperature of the processing chamber. Meanwhile, the pressure medium gas after being thermally exchanged with the workpiece W in the processing chamber is at a temperature which is substantially the same as the temperature inside the processing chamber, and such pressure medium gas has the temperature higher than the temperature of the heat accumulator 43. Therefore, heat exchange between the pressure medium gas of such high temperature and the heat accumulator 43 enables the heat accumulator 43 with the high heat capacity to absorb heat energy of the pressure medium gas and thereby the temperature of the pressure medium gas can be decreased in a short time.

As described above, according to the HIP device 1, the inside of the processing chamber can be quickly cooled in an extremely short time, and heat processing requiring quick cooling can be performed subsequently to the cooling step of the HIP processing. Further, in the heat processing, reheating processing is not required, therefore shortening a manufacturing process and contributing to energy conservation. If quick cooling can be performed in the cooling step after the HIP processing, it is unnecessary that reheating processing and quick cooling specifically for a solution heat treatment are purposely performed after the HIP processing. Thus, a workpiece does not need to be reheated and quickly cooled after the HIP processing as in a conventional solution heat treatment and such trouble can be saved; therefore, the solution heat treatment process can be drastically simplified. In addition, substantial energy conservation can be attained.

Further, quick cooling of the processing chamber by using the foregoing heat accumulator 43 and the cooling promotion flow path 44 is suitable for cooling for a temperature region practically from 1200 degrees C. to 500 degrees C. For example, in a solution heat treatment or the like on alloys based on nickel, quick cooling from 1200 degrees C. to 500 degrees C. is required. The temperature region from 1200 degrees C. to 500 degrees C. is quickly cooled; thereby, the solution heat treatment can be performed together in the cooling step after the HIP processing.

The present invention is not limited to the foregoing respective embodiments; but the shape, the structure, and the material of each member and the combination thereof can be changed appropriately as long as the nature of the invention is not changed. In particular, in the embodiment disclosed here, for matters not clearly disclosed, such as driving conditions, operation conditions, various types of parameters, sizes, weights, and volumes of components, values which can be easily assumed by ordinary persons skilled in the art are applied without departing the range normally implemented by the skilled person.

As described above, according to the present invention, the HIP device that includes the processing chamber and that can cool the inside of the processing chamber in a short time is provided. The present invention provides a hot isostatic pressing device which includes a processing chamber to performs isostatic pressing processing to a workpiece by using pressure medium gas in the processing chamber, the hot isostatic pressing device including: a gas impermeable casing arranged to surround the workpiece; a heating unit provided inside the casing to form the processing chamber around the workpiece; a high-pressure container housing the heating unit and the casing; a heat accumulator provided below the processing chamber, the heat accumulator being thermally exchanged with the pressure medium gas to promote cooling of the pressure medium gas; and a cooling promotion flow path formed within the casing. The casing is arranged to form a first circulation flow in which the pressure medium gas passes upward through an inner flow path in the casing, passes downward through an outer flow path between an inner circumferential surface of the high-pressure container and an outer circumferential surface of the casing, and then returns to the inner flow path and to form a second circulation flow in which the pressure medium gas that has diverged from the first circulation flow is thermally exchanged with the workpiece inside the processing chamber in the casing and then returns to the first circulation flow. Before the pressure medium gas of the second circulation flow thermally exchanged with the workpiece joins the pressure medium gas of the first circulation flow, the cooling promotion flow path guides the pressure medium gas of the second circulation flow to the heat accumulator to allow the pressure medium gas of the second circulation flow to be cooled by the heat accumulator.

According to the HIP device, the pressure medium gas is guided by the cooling promotion flow path to the heat accumulator and the guided pressure medium gas is thermally exchanged with the heat accumulator; thereby, the inside of the processing chamber of the HIP device can be cooled in a short time.

Preferably, the heat accumulator includes a porous structure internally provided with multiple pores.

Alternatively, preferably, the heat accumulator includes a multilayer structure having plural metallic plates which are arranged to be spaced from one another.

It is preferable that the casing is configured to allow the pressure medium gas forming the first circulation flow and the pressure medium gas forming the second circulation flow to unite at a lower end of the inner flow path, which is located below the processing chamber; that the heat accumulator is provided in a vertical position between the processing chamber and the lower end of the inner flow path; and that the pressure medium gas that has diverged from the second circulation flow is guided by the cooling promotion flow path to pass downward relative to the heat accumulator.

The invention claimed is:

1. A hot isostatic pressing device which includes a processing chamber to perform isostatic pressing processing to a workpiece by using pressure medium gas in the processing chamber, the hot isostatic pressing device comprising:

a gas impermeable casing arranged to surround the workpiece;

a heating unit provided inside the casing to form the processing chamber around the workpiece;

a high-pressure container housing the heating unit and the casing;

a heat accumulator provided below the processing chamber, the heat accumulator being thermally exchanged with the pressure medium gas to promote cooling of the pressure medium gas; and a cooling promotion flow path formed in the casing, wherein the casing is arranged to form a first circulation flow in which the pressure medium gas passes upward through an inner flow path in the casing, passes downward through an outer flow path between an inner circumferential surface of the high-pressure container and an outer circumferential surface of the casing, and then returns to the inner flow path and to form a second circulation flow in which the pressure medium gas that has diverged from the first circulation flow is thermally exchanged with the workpiece inside the processing chamber in the casing and then returns to the first circulation flow, and wherein before the pressure medium gas of the second circulation flow thermally exchanged with the workpiece joins the pressure medium gas of the first circulation flow, the cooling promotion flow path guides the pressure medium gas of the second circulation flow to the heat accumulator to allow the pressure medium gas of the second circulation flow to be cooled by the heat accumulator.

2. The hot isostatic pressing device according to claim 1, wherein the heat accumulator includes a porous structure internally provided with multiple pores.

3. The hot isostatic pressing device according to claim 1, wherein the heat accumulator includes a multilayer structure having a plurality of metallic plates which are arranged to be spaced from one another.

4. The hot isostatic pressing device according to claim 1, wherein the casing is configured to allow the pressure medium gas forming the first circulation flow and the pressure medium gas forming the second circulation flow to unite at a lower end of the inner flow path, the lower end being located below the processing chamber, wherein the heat accumulator is provided in a vertical position between the processing chamber and the lower end of the inner flow path, and wherein the pressure medium gas that has diverged from the second circulation flow is guided by the cooling promotion flow path to pass downward relative to the heat accumulator.

* * * * *